United States Patent
Julien et al.

(10) Patent No.: US 8,588,245 B2
(45) Date of Patent: Nov. 19, 2013

(54) METHODS AND SYSTEMS FOR FRAME GENERATION IN COMMUNICATION NETWORKS

(75) Inventors: Martin Julien, Laval (CA); Robert Brunner, Montreal (CA); David Gordon, Montreal (CA); Ludovic Beliveau, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 262 days.

(21) Appl. No.: 12/372,528

(22) Filed: Feb. 17, 2009

(65) Prior Publication Data

US 2010/0208752 A1 Aug. 19, 2010

(51) Int. Cl.
*H04L 12/54* (2013.01)

(52) U.S. Cl.
USPC .......................................... 370/429

(58) Field of Classification Search
USPC ................................. 370/384–433
See application file for complete search history.

(56) References Cited

U.S. PATENT DOCUMENTS

| | | | |
|---|---|---|---|
| 5,926,478 A * | 7/1999 | Ghaibeh et al. .......... | 370/395.51 |
| 6,728,248 B1 * | 4/2004 | Uchida et al. .............. | 370/395.1 |
| 7,266,295 B2 | 9/2007 | Ovadia et al. | |
| 7,298,973 B2 | 11/2007 | Ovadia et al. | |
| 7,376,136 B2 * | 5/2008 | Song et al. .................... | 370/392 |
| 2001/0021201 A1 * | 9/2001 | Tanaka et al. ................. | 370/526 |
| 2002/0051455 A1 * | 5/2002 | Lee et al. ................ | 370/395.21 |
| 2002/0114043 A1 * | 8/2002 | Kozaki et al. ................. | 359/167 |
| 2004/0109450 A1 * | 6/2004 | Kang et al. ..................... | 370/390 |
| 2004/0109688 A1 * | 6/2004 | Kim et al. ........................ | 398/68 |
| 2004/0151191 A1 | 8/2004 | Wu et al. | |
| 2004/0258094 A1 * | 12/2004 | Bashan et al. ................ | 370/486 |
| 2005/0249498 A1 * | 11/2005 | Haran et al. .................... | 398/58 |
| 2007/0019957 A1 * | 1/2007 | Kim et al. ........................ | 398/72 |
| 2007/0041384 A1 * | 2/2007 | Das et al. .................... | 370/395.4 |
| 2007/0223490 A1 * | 9/2007 | Mizutani et al. ........... | 370/395.6 |
| 2009/0010650 A1 | 1/2009 | Tsuchiya et al. | |
| 2009/0097861 A1 * | 4/2009 | Ikeda et al. ................ | 398/167.5 |
| 2009/0162064 A1 * | 6/2009 | Mizutani et al. ................ | 398/66 |
| 2009/0263130 A1 * | 10/2009 | Luo et al. ........................ | 398/58 |

FOREIGN PATENT DOCUMENTS

| | | |
|---|---|---|
| EP | 1 513 305 A2 | 3/2005 |
| WO | 2007/149697 A1 | 12/2007 |

OTHER PUBLICATIONS

Mark Handley: "GeRM: Generic RTP Multiplexing"; Internet Engineering Task Force, Nov. 11, 1998; XP-002139359, 7 pages.
John Allen Robinson: "Software Design for Engineers and Scientists"; Dec. 31, 2004; Newnes, XP040425980, 414 pages.
International Search Report for PCT/IB2010/050714 dated Aug. 13, 2010; 9 pages.

\* cited by examiner

*Primary Examiner* — Kwang B Yao
*Assistant Examiner* — Juvena Loo
(74) *Attorney, Agent, or Firm* — Ericsson Canada Inc.; Alex Nicolaescu

(57) ABSTRACT

Exemplary embodiments provide for methods and systems that enable frame generation by fields taken from various queues. Protocol control can also or alternatively be distributed so that one or more header fields can be generated separately from other portions of a frame, e.g., the payload. The one or more header fields can be entered into queues from which they are taken to generate frames.

18 Claims, 9 Drawing Sheets

METHODS AND SYSTEMS FOR FRAME GENERATION IN COMMUNICATION NETWORKS

TECHNICAL FIELD

The present invention relates generally to telecommunications systems and in particular to methods and systems for frame generation in such networks.

BACKGROUND

Communications technologies and uses have greatly changed over the last few decades. In the fairly recent past, copper wire technologies were the primary mechanism used for transmitting voice communications over long distances. As computers were introduced the exchange of data between remote sites became desirable for many business, individual and educational purposes. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for use, which in turn increases the need to continue to improve the available bandwidth for delivering these services, particularly as the quality of video and overall amount of content available for delivery increases.

One promising technology that has been introduced is the use of optical fibers for telecommunication purposes. Optical fiber network standards, such as synchronous optical networks (SONET) and the synchronous digital hierarchy (SDH) over optical transport (OTN), have been in existence since the 1980s and allow for the possibility to use the high capacity and low attenuation of optical fibers for long haul transport of aggregated network traffic. These standards have been improved upon and today, using OC-768/STM-256 (versions of the SONET and SDH standards respectively), a line rate of 40 gigabits/second is achievable using dense wave division multiplexing (DWDM) on standard optical fibers.

In the access domain, information regarding optical networking can be found in Ethernet in the First Mile (EFM) standards (IEEE 802.3ah which can be found at www.ieee802.org and is included herein by reference) supporting data transport over point-to-point (p2p) and point-to-multipoint (p2mp) optical fiber based access network structures. Additionally the International Telecommunications Union (ITU) has standards for p2mp relating to the use of optical access networking. Networks of particular interest for this specification are passive optical networks (PONs). For example, three PONs of interest are, e.g., Ethernet PONs (EPONs), broadband PONs (BPONs) and gigabit capable PONs (GPONs), various exemplary characteristics of which are displayed below for comparison in Table 1.

TABLE 1

Major PON Technologies and Properties

| Characteristics | EPON | BPON | GPON |
| --- | --- | --- | --- |
| Standard Protocol | IEEE 802.3ah Ethernet | ITU-T G.983 ATM | ITU-T G.984 Ethernet |
| Rates (Mbps) | 1244 up/1244 down | 622/1244 down 155/622 up | 1244/2488 down 155 to 2488 up |
| Span (Km) | 10 | 20 | 20 |
| Number of Splits | 16 | 32 | 64 |

With these ongoing improvements in optical networks, many telecommunication companies are choosing to upgrade their copper centric access networks with fiber optic access networks. Some such upgrades include, for example, using one of the above described PON networks combined with fiber to the home (FTTH), and/or hybrid networks, e.g., fiber to the cabinet (FTTC) combining optical EFM and/or PON for data backhaul with very high speed digital subscriber line (VDSL2) by reusing the last hundred meters or so of copper wire. These upgrades allow an increase in the types and quality of services delivered by companies to end users. As such services are deployed, there will be more demand for these networks and it will be desirable to be able to deploy PONs (and other networks) which are, for example, both flexible, e.g., from a manufacturing and supplier perspective, and scalable to meet this demand.

Like many other communication systems, lower level protocols are provided in PONs which are responsible for packaging and routing higher level data. Such lower level protocols generate data frames or packets which can generally be characterized as having a control (overhead) portion and a user (data) portion, although each of these portions may be further subdivided into a number of different fields. Although each frame or packet will typically include both a control portion and a user portion, these two portions may have different time criticality relative to the consumer (recipient) of the frame or packet. Additionally, the control portion may, itself, have some fields whose values are repeated in some or all of a number of sequentially transmitted frames, while other fields have values which change more rapidly, e.g., from frame to frame. Also, the time criticality of receipt by the downstream consumer of the frame for each field within the control portion may vary from field to field.

Accordingly, it would be desirable to provide methods and systems which provide flexibility to the manner in which data frames or packets are constructed.

SUMMARY

Systems and methods according to the present invention address this need and others by facilitating flexibility in communication networks, e.g., in passive optical networks (PONs), by providing various flexible mechanisms for generating frames, e.g., associated with a medium access (MAC) layer.

According to one exemplary embodiment a frame generation system for generating frames in a communication system includes a plurality of queues, each of the queues having a plurality of entries each capable of holding at least one field of data to be transmitted in a frame, and a frame generator for generating frames for transmission, wherein the frame generation system selects a field of data from a head entry of one of the plurality of queues and uses the selected field of data to construct at least a portion of a frame for transmission.

According to another exemplary embodiment, a frame generation method includes the steps of entering data fields into a plurality of queues, each of the queues having a plurality of entries each capable of holding at least one of the fields of data, selecting a field of data from a head entry of one of the plurality of queues, and constructing at least a portion of a frame for transmission using the selected field of data.

According to another exemplary embodiment, a communications method includes the steps of receiving at least one header field, entering the at least one header field into one or more of at least two queues, and generating a frame, the frame including a header and a payload, the header including at least one field taken from one or more of the at least two queues.

According to another exemplary embodiment, a communications device includes at least two queues for receiving and storing header fields, and a framer unit for generating a frame, the frame including a header and a payload, the header including at least one header field taken from one or more of the at least two queues.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
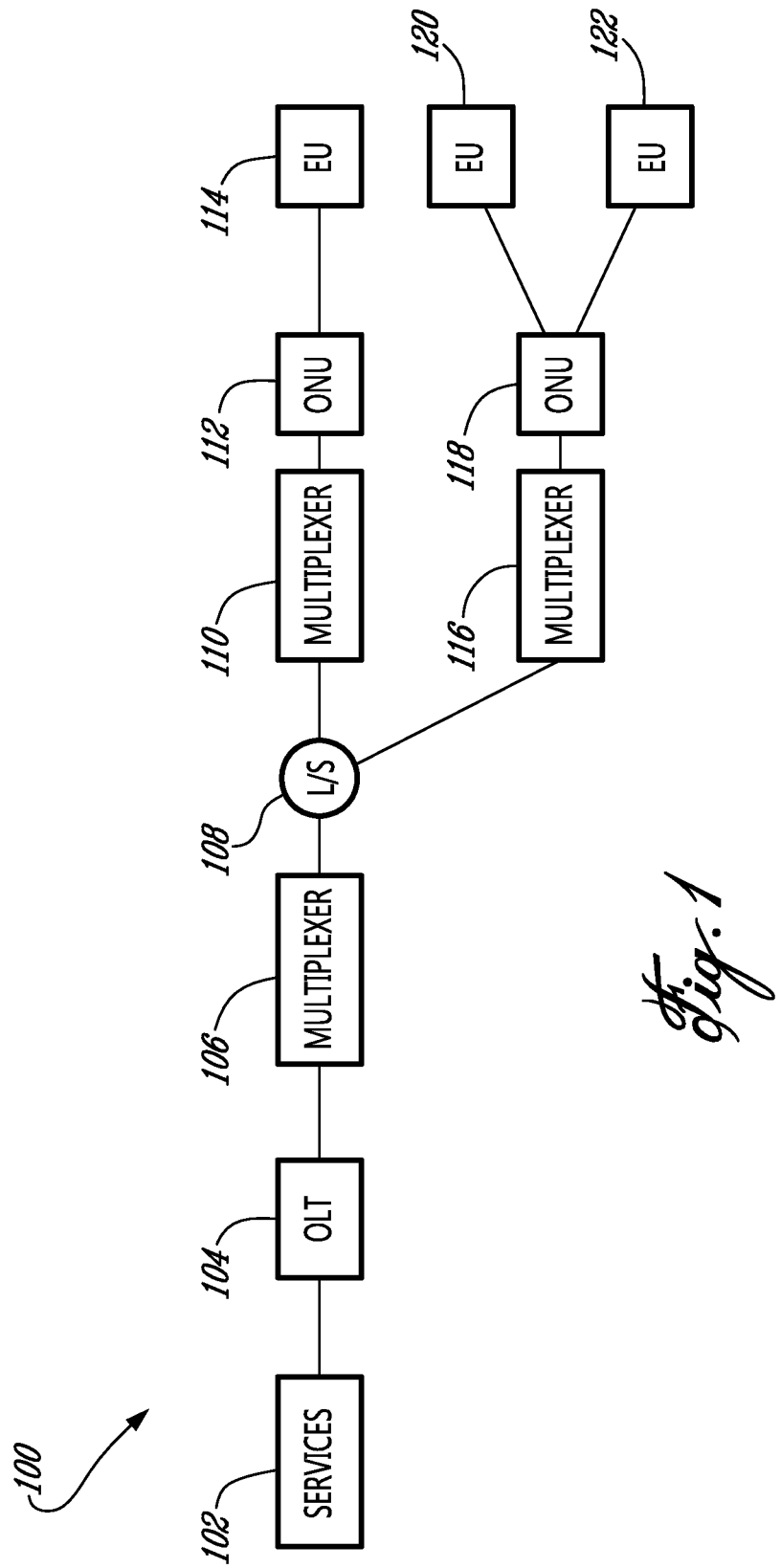
FIG. 1 depicts a Gigabit Passive Optical Network (GPON) in which exemplary embodiments can be implemented.

According to exemplary embodiments it is desirable to provide mechanisms and methods that will, among other things, facilitate flexibility in communication networks by distributing aspects of protocol controls and/or by providing a queuing mechanism which can be used to generate frames. Among other things, such exemplary embodiments can provide for the separation of time critical aspects associated with lower layer protocols from other control aspects associated with those lower layer protocols. In order to provide some context for this discussion, an exemplary Gigabit-capable Passive Optical Network (GPON) is shown in FIG. 1. While a GPON is used as the basis of discussion herein, it will be appreciated by those skilled in the art that other types of PONs, e.g., Ethernet PONs (EPONs) and broadband PONs (BPONs), or even non-optical communication networks, could benefit from the exemplary embodiments described below. Moreover, although the first described exemplary embodiments below focus on the separation of control functionality from data functionality, it will be apparent that the queuing mechanisms described herein can even more generally be used to generate frames at any protocol level regardless of whether control plane functionality is separated from user plane functionality or not.

According to exemplary embodiments, GPON 100 in FIG. 1 shows elements of an optical distribution network (ODN) that interact with various endpoints of an optical network unit (ONU). As shown in FIG. 1, one or more service providers or types 102 can be in communication with an optical line termination (OLT) 104, which is typically located in a central office (CO) (not shown). The OLT 104 provides the network side interface and is typically in communication with at least one ONU 112, 118 (or an optical network termination (ONT) which performs similar functions as an ONU). These service providers 102 can provide a variety of services such as video-on-demand or high definition television (HDTV), Voice over IP (VoIP) and high speed internet access (HSIA). The OLT 104 transmits information to multiplexer 106 which multiplexes the data and transmits the data optically to a passive combiner/splitter 108. The passive combiner/splitter 108 then splits the signal and transmits it to the upstream multiplexers 110 and 116. The multiplexers 110 and 116 demultiplex the signal and forward it on to their respective ONUs 112 and 118. The multiplexers (108, 110 and 116) are typically integrated into both the OLT and the ONUs and are used for placing and extracting the upstream and downstream wavelengths depending upon their locations in the optical network. The ONUs 112 and 118 then forward the information onto their respective end users (EU) 114, 120 and 122, e.g., devices such as a computer, a television, etc. Although only two splits are shown in FIG. 1 to simplify the figure, it will be appreciated that any number of splits N can be provided by splitter 108, e.g., 32 or 64. In the future it is envisioned that even more endpoints and splits will be served by each OLT 104, making issues of flexibility even more significant for deploying such GPON systems.

It will be understood by those skilled in the art that this purely illustrative GPON 100 can be implemented in various ways, e.g., with modifications where different functions are combined or performed in a different manner. For example the multiplexers (108, 110 and 116) typically are duplexers, but if an additional signal is being transmitted, e.g., a cable-television signal in a GPON 100, they can act as triplexers. Additionally in the upstream direction, the optical signal would typically have a different wavelength from the downstream signal and use the same multiplexers 106, 110 and 116, which have bidirectional capabilities.

Figure 2:
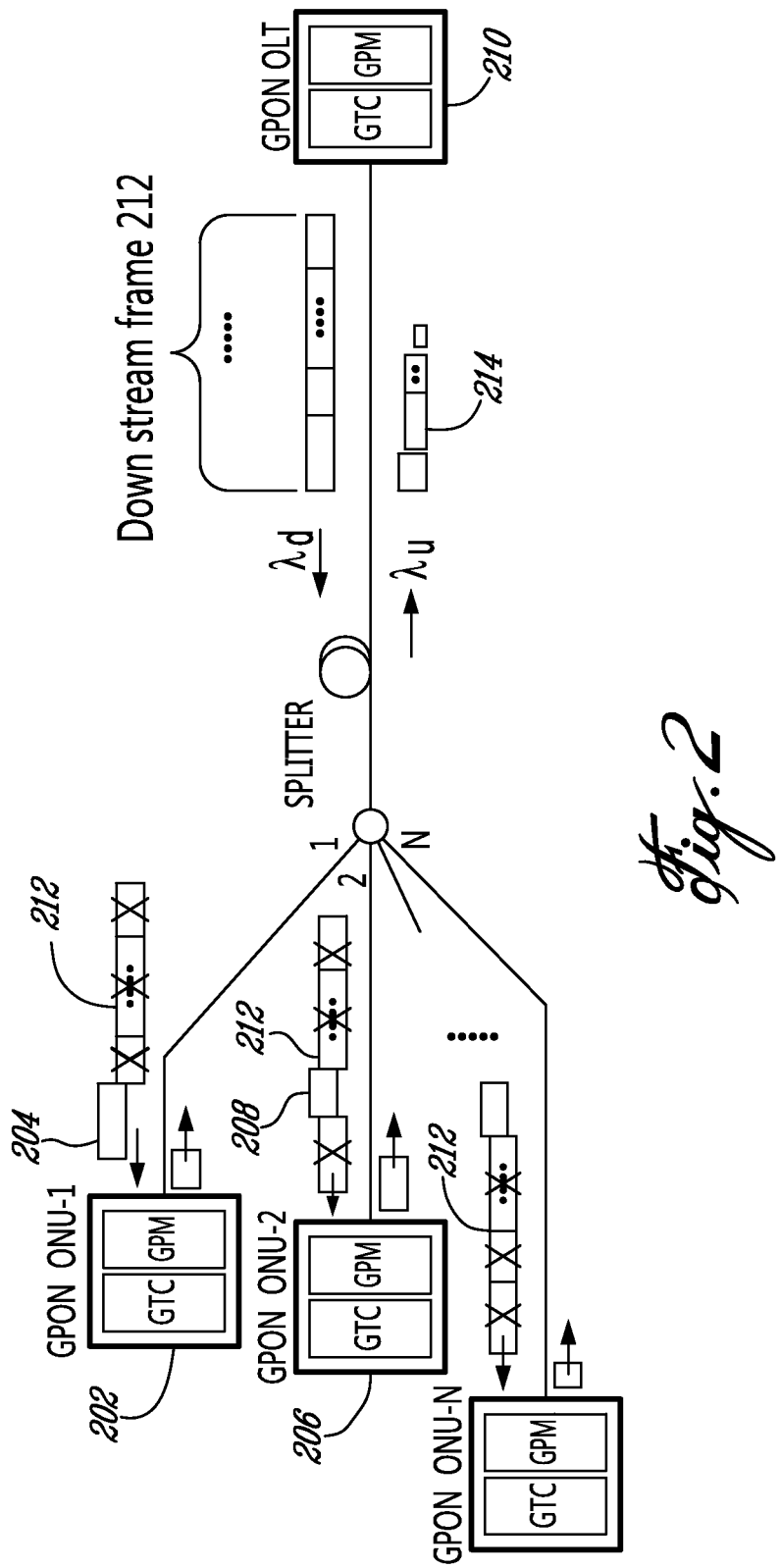
FIG. 2 illustrates Optical Network Units (ONUs) of FIG. 1 using a time division multiple access (TDMA) scheme to communicate with an associated Optical Line Termination (OLT)

In the upstream direction, a TDMA scheme (e.g., as shown in FIG. 2) is used in a PON where ONUs 202 and 206 are allowed to transmit data in granted time-slots on their optical wavelength(s) within an upstream 125 µs frame. This means that ONUs 202, 206 transmit in a burst mode at their allotted time slots, as compared to an entire 125 µs long frame 212 being transmitted in the downstream direction from the OLT 210. The OLT 210 transmits a 125 µs long frame 212 which is composed of a GPON transmission convergence (GTC) header and a GTC payload. The GTC payload typically contains a sequence of G-PON Encapsulation Method (GEM) headers and GEM payloads, with the GEM header containing information identifying the destination ONU, e.g., the ONU-ID, and the GEM payload containing the desired data. Since the ONUs 202, 206 are located at different distances from the OLT 210, the ONTs 202, 206 are informed by the OLT 210 when, and with what power, to transmit their respective bursts so that the ONUs signals are arriving in an aligned time structure at the OLT 210.

While each ONU 202, 206 in FIG. 2 is illustrated as receiving a single GEM header/payload segment within the frame 212 in sequential order, it is possible for an ONU 202, 206 to receive multiple GEM header/payload segments within a single downstream frame 212 in whatever order the OLT 210 decides to use since each ONU can filter the downstream data based, e.g., on its assigned ONU-ID. Based on the received data, e.g., an upstream bandwidth map field which is optionally present within the GTC header, the ONUs 202, 206 know their transmission time slot, which results in an upstream message 214 where the different ONU outputs are in a time sequential order.

Figure 3:
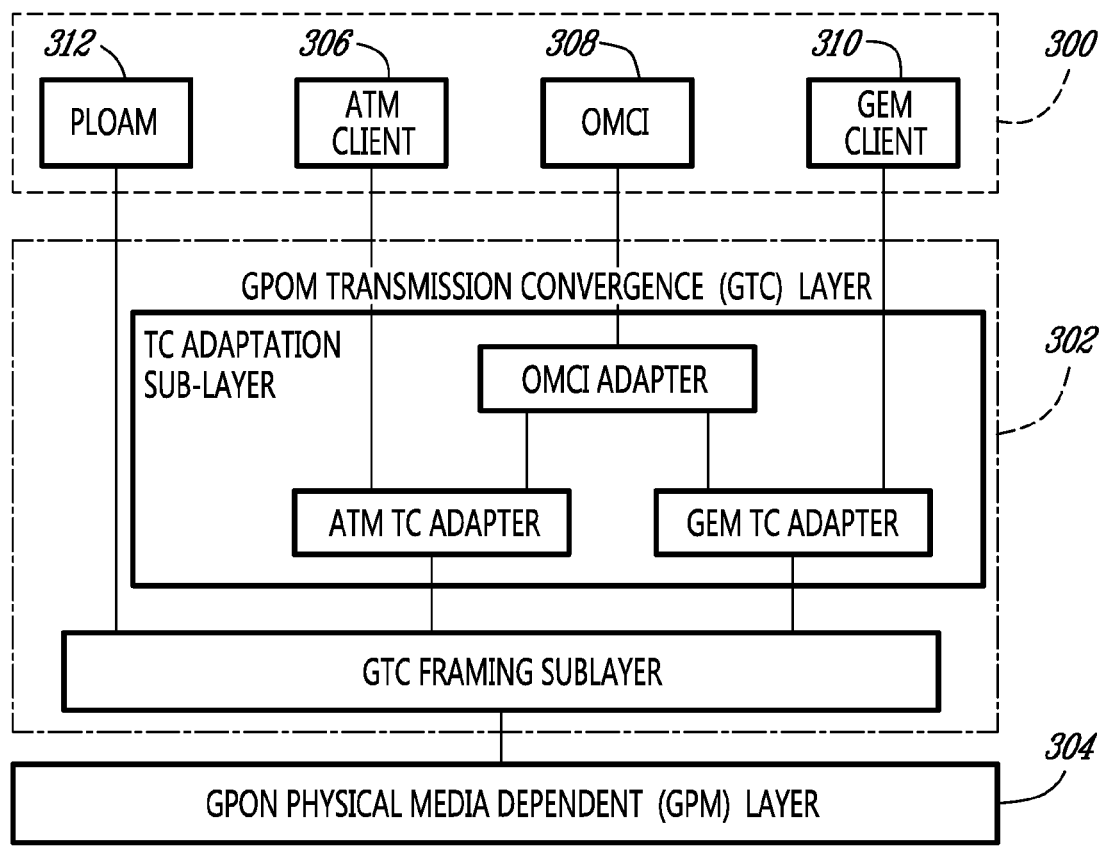
FIG. 3 shows a conventional GPON protocol stack which can be used in conjunction with exemplary embodiments.

As seen in FIG. 2, each ONT (or ONU) will have components associated with processing data at the various layers in the GPON protocol stack, e.g., the GPON physical media dependent layer (GPM) and the GTC layer. The GPON protocol stack can be conceptualized as described in the ITU Recommendation G.984.3, entitled "Transmission Convergence Layer Specification", the description of which is incorporated here by reference, and as illustrated in FIG. 3. Therein, the conventional protocol stack of the GPON 100 includes a higher level protocol layer 300 which interfaces with an upper layer (not shown), a GTC layer 302, and a GPM layer 304. The protocol layer 300 includes an asynchronous transfer mode (ATM) client 306, an ONT management control interface (OMCI) 308, a GEM client 310, and a physical layer operation administration maintenance (PLOAM) module 312. The GTC layer 302 converts upper layer frames, e.g., ATM or GEM frames, which it receives into a GTC frame and then transmits the GTC frame. In the illustrated, exemplary protocol stack of FIG. 3, the GTC layer supports, e.g., both ATM and GEM, although those skilled in the art will appreciate that an implementation could support, for example, either ATM or GEM rather than supporting both by providing only a respective client in layer 300.

Today's implementations of GPON systems employ a monolithic approach which bundles all of the protocol's building blocks together on the same processing unit. Like many other transport technologies (e.g., switching, routing, etc.), the traffic flows are usually handled by a low level processing unit such as application specific integrated circuit (ASIC), field programmable gate array (FPGA) or network processors. These switching fabrics are somewhat complex to program, but they offer very high performance for very specific functionalities. On the other hand, such low level environments make it hard to introduce changes and evolve the forwarding unit. For example, some parts of the transport system are less dependent on performance, and are therefore better suited to design and development using a high level programming language.

Figure 4A:
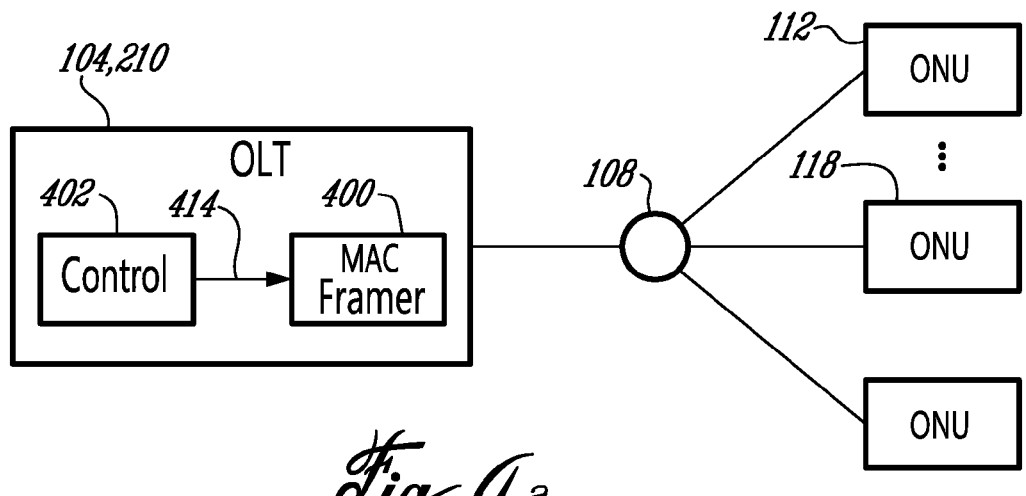
FIG. 4(a) illustrates a GPON having an OLT wherein medium access layer (MAC) protocol control is distributed according to an exemplary embodiment.

According to exemplary embodiments, the control layer (or one or more portions thereof) and user layers associated with MAC protocol control can be separated into different physical and logical entities. For example, as shown in FIG. 4(a), MAC protocol control functionality in an OLT 104, 210 can be separated into a MAC framer unit 400 and a control unit 402. The MAC framer unit 400 can, for example, operate to control PON media access (i.e., in a manner corresponding to the functionality of an OSI layer 2-link layer), manage user traffic, perform frame delineation for TDM/TDMA access schemes, as well as other functions including forward error correction (FEC), AES encryption, etc. The control unit 402 can, for example, handle signaling associated with the network topology, e.g., associated with ODNs, ONUs, and service networks, operation protocols (e.g., PLOAM, OMCI), and configuration and management. However, as mentioned above, these exemplary embodiments are not limited to GPON or even optical communication systems.

Figure 4B:
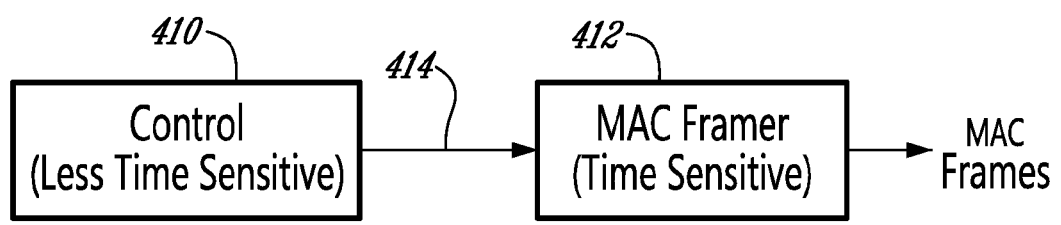
FIG. 4(b) depicts a generic MAC environment wherein protocol control is distributed according to another exemplary embodiment.

Thus, as shown in FIG. 4(b), according to another exemplary embodiment, MAC protocol functionality can be generically separated into a control unit 410, which coordinates the provision of less time sensitive portions of a MAC frame, and a MAC framer 412 which coordinates the provision of more time sensitive portions of a MAC frame, the output of which are complete MAC frames for transmission. The control unit 402, 410 and the MAC framer 400, 412 may, for example, be implemented as separate processors, chips, ASICs or FPGAs, which communicate with one another via an interface 414. In this regard, the control unit 402, 410 could, for example, be implemented as a more general purpose processor programmed in a higher level language while the MAC framer 400, 412 could be implemented as an FPGA or processor programmed in a lower level language.

Unlike conventional MAC protocol implementations wherein the control functionality and MAC framer functionality are typically tightly integrated, some of these exemplary embodiments distribute these two aspects of MAC protocol control, both physically and logically, in order to provide flexibility in manufacturing and design. Among other things, this enables, for example, one manufacturer to provide the control units 402, 410 while another manufacturer provides the MAC framer units 400, 412, and also permits these two different units to be designed in accordance with their relative change in functionality, e.g., using higher level programming languages and supporting structures for the control systems and lower level programming languages or structures for the MAC framers. However, distribution of these functions comes with the price of communication and coordination between the two functions that were unnecessary in conventional, tightly integrated MAC protocols. Addressing this issue provides further benefits in the context of queuing mechanisms which can be used to generate frames, either in conjunction with the separation of control and user plane functionality or independent thereof.

Consider first of all the communication interface 414 disposed between the control systems 402, 410 and the MAC framer units 400, 412. According to exemplary embodiments, this interface 414 provides mechanisms for binding and discovery, exchange of messages (e.g., PLOAMs, BWMaps, OMCI messages and DBRu messages in the example of GPONs used here), reporting of alarms (e.g., link down, drifting, etc.) and configuration. For identifying a MAC framer unit 400, 412 from a control plane perspective, a logical ID can be introduced to addressing these nodes. Node ID and link address can be exchanged between a control system 402, 410 and a MAC framer 400, 412 during a binding and discovery mechanism, after which messages can be normally exchanged. During the lifetime of the connection between these nodes, the control protocol can also provide a heartbeat functionality in order for the control layer and the MAC framer layer to know the status of one another. Thus, a heartbeat signal can be sent both ways over the interface 414 and, if a node fails to receive a predetermined number of heartbeats from the other node, that other end is determined to be down or offline. The interface 414 can be provided using any desired transport mechanism for the above-described control messages, e.g., the interface 414 could be implemented over a direct link between two processors, operating as the control system 402, 410 and the MAC framer 400, 412, respectively, on a same board or over a long distance link, e.g., an Ethernet link.

In addition to the provision of an interface between the two, distributed portions of the MAC protocol according to these exemplary embodiments, another consideration associated with the separation of these functions involves timing/synchronization. Consider again the exemplary GPON system for context. As mentioned above, the GPON messages are transported on fixed length timeslots of 125 microseconds. The scheduling of the upstream and downstream channels is synchronized between the OLT and the ONUs in a shared clocking domain. This strict timing environment makes it more complex to develop than statistical multiplexing (best effort packet transport for example).

However, in those exemplary embodiments wherein at least some of the functionality associated with the control plane is separated from that of the user plane for MAC frame generation, it may be advantageous to permit the control system 402, 410, which coordinates less time sensitive operations, to operate at a different clock speed from that of the MAC framer 400, 412. For example, the control system 402, 410 may operate using a clock having a resolution of 1 millisecond or 10 milliseconds, whereas the time sensitive MAC framer 400, 412 may operate using a clock having a resolution of 125 microseconds or less. In such a case where the control plane is implemented on a non-real time platform, various mechanisms may be needed to enable the control system 402, 410 to (a) specify the transmission of messages over the time domain of the MAC framer 400, 412 and/or (b) provide interface structures which accommodate the asynchronous relationship between the two, distributed portions of the MAC architecture according to these exemplary embodiments. Of course, as mentioned earlier and described in more detail below, other exemplary embodiments permit control and user plane functionality to remain integrated, but take advantage of the flexible queuing mechanisms described herein to generate data frames.

Figure 5:
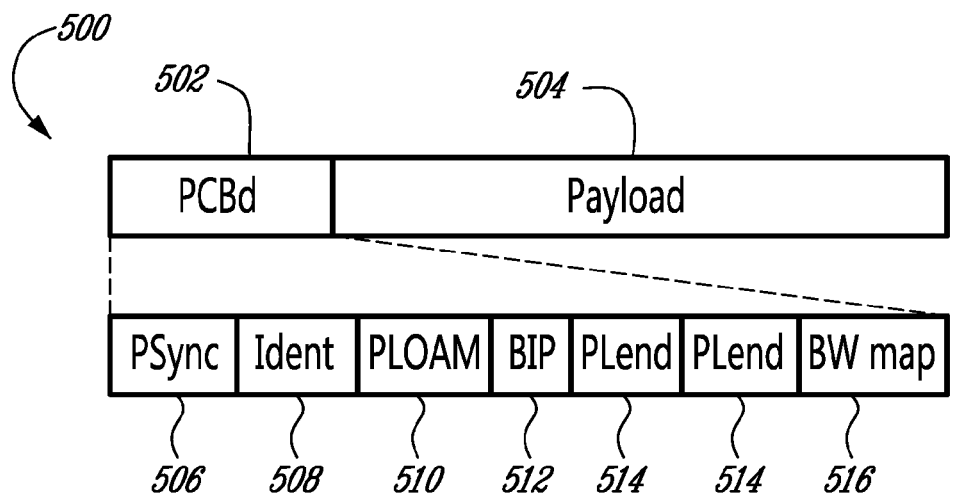
FIG. 5 illustrates a conventional GPON transmission convergence (GTC) layer frame which can be used in conjunction with exemplary embodiments.

For example, according to one exemplary embodiment, the control system 402, 410 can be responsible for providing less time sensitive (but still frequently changing) field values for MAC frame generation, while the MAC framer 400, 412 provides more time critical field values, e.g., GTC payload data, for MAC frame generation. In the context of the GPON systems described above, such fields managed by the control system 402, 410 could, for example, include the PLOAM field and the BWmap field portions of a GTC frame header, an example of which is illustrated in FIG. 5. Therein, a downstream GTC frame 500 includes a header, e.g., a physical control block downstream (PCBd) field 502, and a payload field 504. The PCBd field 502 includes a PSync field 506, which includes a bit pattern to be used for physical synchronization of the received GTC frame, an Ident field, which includes a superframe counter value, a Physcial Layer Operations, Administration and Maintenance (PLOAMd) field 510, which carries, for example, OAM, ranging, alert and activation messages, a Bit Interleaved Parity (BIP) field 512, a (repeated) PLend field 514, which carry information regarding the length of the BandWidth (BW) Map field 516, and the BW map field 516 itself which grants upstream bandwidth to the ONUs 112, 118 for upstream transmissions. For example, each BWmap field 516 can include an allocation structure for each ONU 112, 118 (and/or for each transmission container (TCONT) associated with each ONU) active in the GPON 100. The allocation structure includes an Alloc-ID field for identifying the ONU/TCONT, as well as a start time and stop time for the allocated upstream bandwidth.

Within this exemplary MAC frame structure, the PLOAMd field 510 and the BWmap field 516 are examples of portions of the MAC frame structure which change relatively frequently, but are not as time critical for receipt as, for example, the payload data field 504. Thus the following exemplary embodiments illustrate how the control system 402, 410 can manage the provision of these field values to the MAC framer 400, 412. However, it should be appreciated that the present invention is not so limited and that, for example, the control system 402, 410 could be used to provide only one of these two GTC fields, different GTC field(s), or other non-GTC fields when implemented in systems other than GPON systems.

Figure 6:
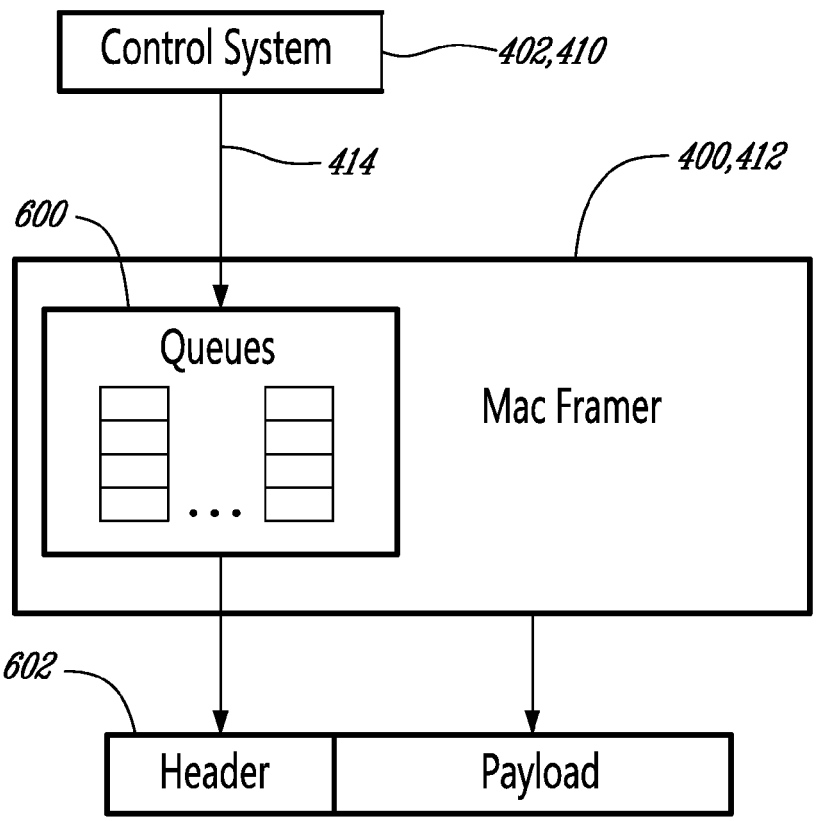
FIG. 6 shows a distributed protocol control system according to exemplary embodiments including a queuing mechanism.

FIG. 6 illustrates an exemplary embodiment wherein the interface 414 includes a queuing mechanism 600 which receives configuration messages from the control system 402, 410 and which is provided between the control system 402, 410 and the MAC framer 400, 412. In this exemplary embodiment, the queuing system 600 is physically disposed in the same hardware as the MAC framer 400, 412, although this location for the queues 600 is not required, e.g., the queuing system 600 could be disposed adjacent to, and synchronized with, the MAC framer chip on a printed circuit board. The configuration messages sent by the control system 402, 410 may each include a number of fields which can then be used to populate the queuing mechanism 600. Examples of specific queue sets which can be used to implement the queuing mechanism 600 are described below with respect to FIGS. 8(a)-8(c). The entries in the queuing system 600 are then used by the MAC framer 400, 412 to assist in building the protocol elements and, ultimately, the MAC frame 602. The control system 402, 410 can be implemented as, for example, a general purpose processor, an application specific integrated circuit (ASIC) or a field programmable gate array (FPGA). Similarly, the MAC framer 400, 412 can also be implemented as, for example, a different ASIC, FPGA or general purpose processor relative to the control system 402, 410. If the MAC framer 400, 412 physically includes the queuing system 600, then the queuing system 600 may be implemented as a physical memory device, e.g., cache memory, or random access memory, or may be implemented in software as, e.g., a linked list or circular buffer.

Figure 7:
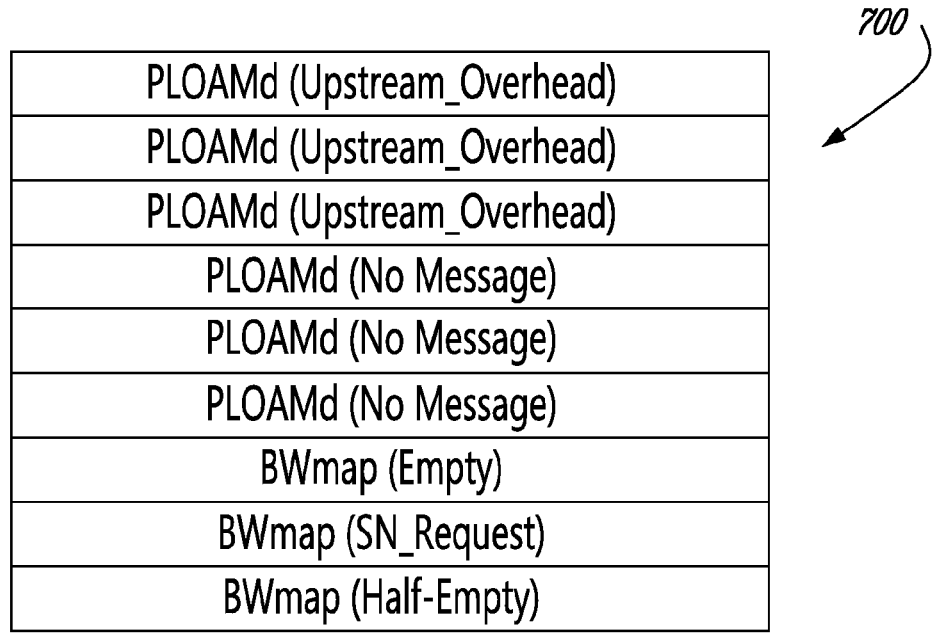
FIG. 7 depicts an exemplary configuration message according to an exemplary embodiment.

FIG. 7 illustrates an exemplary configuration message 700 which can be transmitted from the control system 402, 410 to the queuing mechanism 600. This purely illustrative configuration message 700 can be used to provide PLOAM and BW map fields as part of MAC frames which are used to range an ONU 112, 118. The exemplary configuration message 700 is sent by the control system 402, 410 to the MAC framer 400, 412. The MAC framer 400, 412 queues the exemplary configuration message 700 in the order shown in a FIFO queue in queuing mechanism 600. For the next outgoing GTC frame, the MAC framer 400, 412 will thus use the half-empty BWmap located at the bottom of the queue and then decrement the queue by one element, i.e., any remaining entries in that particular queue can each be shifted down by one entry from the topmost entry in the queue to the bottommost entry in the queue. Queue operations according to these exemplary embodiments can also employ a pointer for each queue which indicates the queue element that contains a head entry, i.e., the entry in the queue which is next to be taken for frame generation. The head entry pointer can then be incremented (or decremented) once an entry is taken from a particular queue to point to another entry in that queue as the head entry.

For subsequent GTC frames, assuming that no other element of a higher priority queue is pending, each following element from the configuration message 700 can be used once to fill a field in a GTC frame until the queue is empty. The three empty or No Message PLOAMd elements in the exemplary configuration message 700 are also meant to be 'consumed' by the MAC framer 400, 412 to cause a delay in the use of the three PLOAMd elements without specifying any specific header fields to be used by the MAC framer, e.g., to address the difference in clock speeds, if one exists, between the control system 402, 410 and the MAC framer 400, 412.

The queues 600 can be created based on the type(s) of fields, the iterative/FIFO nature of the queue, and the priority. According to one exemplary embodiment, a configuration message 700 can be placed in only one queue at a time. According to such an exemplary embodiment, sending header fields to more than one queue in the queuing mechanism would thus require more than one configuration message to be transmitted by the control system 402, 410. In this way, the configuration of the queues in the MAC framer 400, 412 is transparent to the control system 402, 410. Therefore, the MAC framer 400, 412 will know in which queue to place a received configuration message, by the nature of its content (i.e., type(s) of fields and iterative/FIFO queues).

Alternatively, a configuration message 700 could include one or more header fields, each header field individually specifying a priority and a type of queue (e.g., FIFO, iterative or other). The priority and the type of queue information in the configuration header(s) can then be used to select a queue within the MAC framer 400, 412 for storing the data fields which are conveyed by the configuration message. In order to assure that the queued fields provide the appropriate header fields for a sequence of GTC frames to be generated, the fields can be inserted into the same, highest priority queue, to avoid the possibility that higher priority fields become inserted in between those received in a given configuration message 700.

Figure 8A:
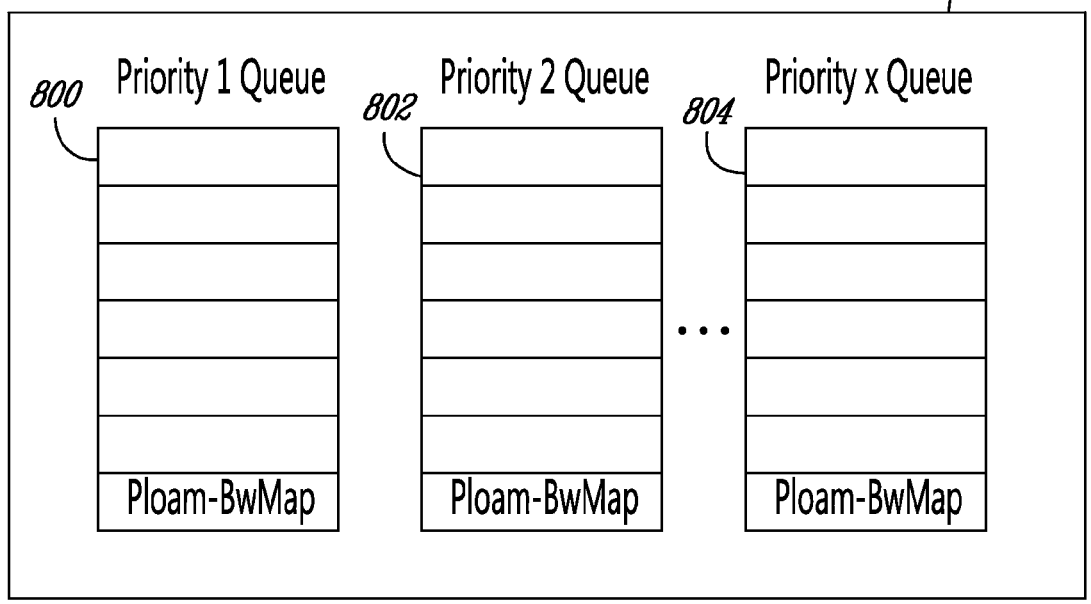
FIGS. 8(a)-8(c) show exemplary queue sets which can be used to implement a queuing mechanism according to exemplary embodiments.
Figure 8B:
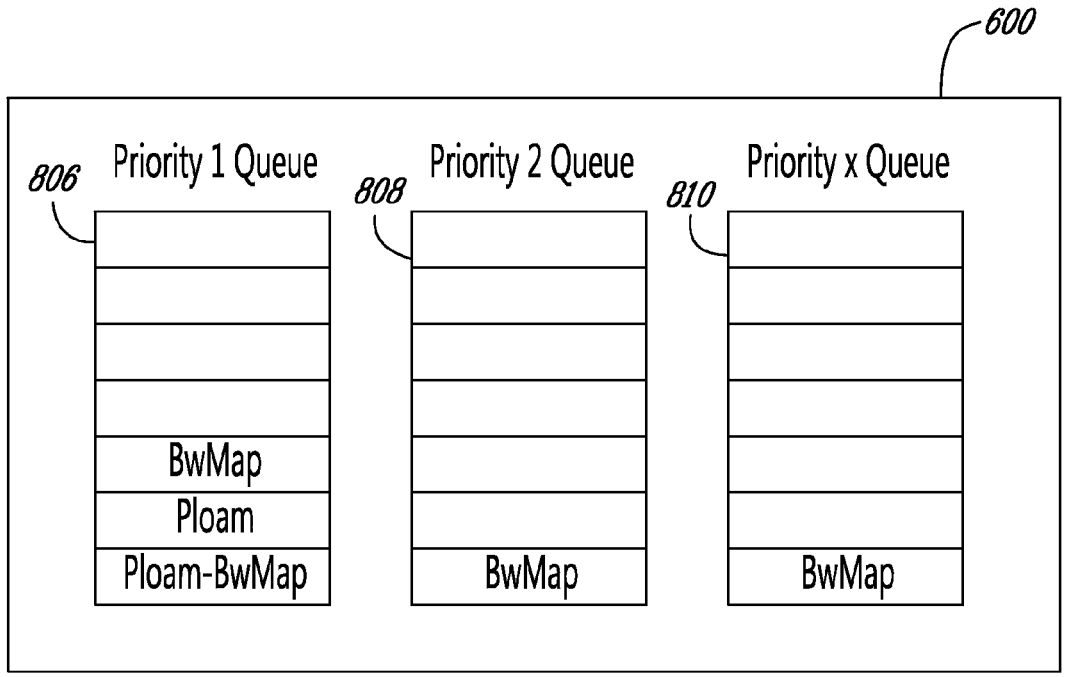
Figure 8C:
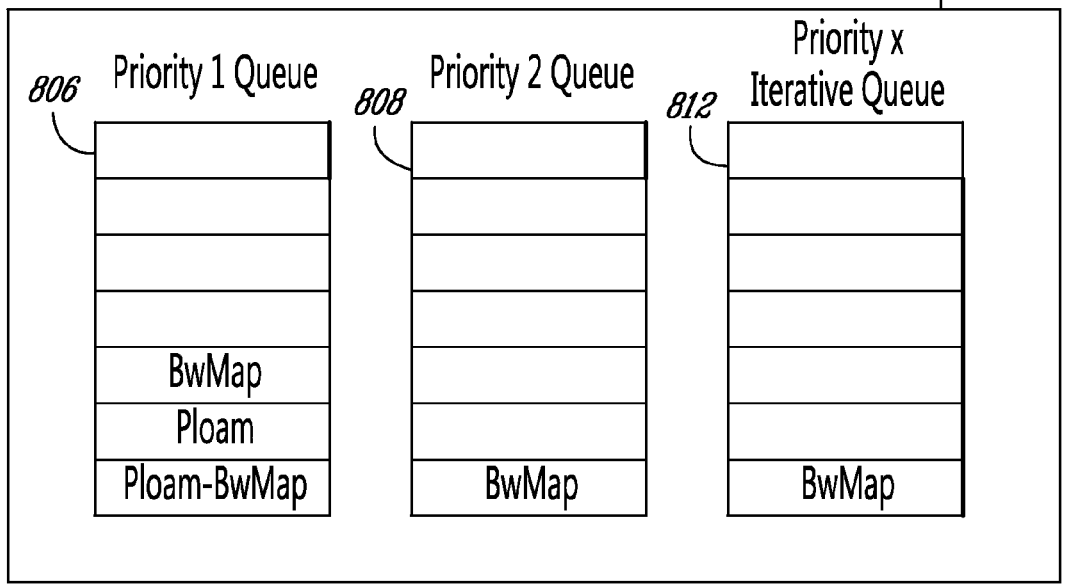

Some examples of sets of queues which can be used to implement the queuing mechanism 600 according to exemplary embodiments will now be described with respect to FIGS. 8(a)-8(c), however it will be appreciated that these examples are purely illustrative and that numerous other types of queue sets could be used. As shown in FIG. 8(a), the queuing mechanism 600 can be implemented as a plurality of queues 1-x, e.g., queue 800, queue 802 . . . queue 804, each of which have a different priority relative to one another, e.g., queue 800 has a higher priority than queue 802 which has a higher priority than queue 804, etc. In each queue, according to this exemplary embodiment, a PLOAM message and/or a BW map message can be present, and when a GTC header is being generated by the MAC framer 402, 410 which needs to be provided with a PLOAM and a BwMap, those fields are selected from the queues 800-804 based on their strict or relative priority. In the example of FIG. 8(a), since queue 800 has an available PLOAM-BW map message combination available, it will be selected before the PLOAM-BW map message combinations which are available from the other queues 802, 804 which have lower priorities in this example.

FIG. 8(a) depicts an exemplary embodiment wherein all of the queues 800-804 contain the same content, in this case combinations of PLOAM-BW map messages, but with different priorities. Note that, in this example, the configuration message 700 which resulted in the queued entries shown in FIG. 8(a) specified that these two fields, i.e., PLOAM and BW map, have to be inserted into the same GTC frame header and, hence, they are stored together. In other examples described below, PLOAM and BW map fields can be stored in different entries, such that such fields from different queues may be sent in the same GTC frame. Alternatively, it might be preferable according to another exemplary embodiment to provide a queuing mechanism 600 which has queues of different priority, but also which may be permitted to contain different types of content per queue. For example, as shown in FIG. 8(b), a highest priority queue 806 may be permitted to contain three different types of entries, e.g., PLOAM only fields, BwMap only fields or PLOAM with BwMap fields, while other, lower priority queues 808 and 810 may be permitted to contain only BwMap fields.

According to the foregoing exemplary embodiments, the highest priority queue in a queuing mechanism 600, in the case where a strict priority is used, would have its data entries processed first by the MAC framer 400, 412 in the order in which elements are added to the queue, e.g., in a first in first out (FIFO) manner. For example, in the case where the highest priority queue includes a PLOAM-BwMap element as the next element to be processed in that queue, then the next GTC header to be generated by the MAC framer 400, 412 would include those PLOAM and BwMap fields. Alternatively, in the case where, for example, only a PLOAM message is available as the next element to be processed in the highest priority queue, then the next elements to be processed in other, lower priority queues could be evaluated to find an available BwMap field for transmission in the next GTC header.

While pre-assigned queue priority is one useful criteria which can be used by the MAC framer 400, 412 for selecting a queue within a queuing mechanism 600 to provide one or more fields to a MAC header according to these exemplary embodiments, consideration of the role of each queue may also provide another or alternative selection criteria. For example, in the exemplary embodiment of FIG. 8(b), if the queue 806 with the highest priority provides only a PLOAM message, then a BwMap message could be selected from the second highest priority queue 808. On the other hand, if the queue 806 with the highest priority would have provided only a BwMap for a particular header, then the MAC, e.g., GTC, header could have been filled in with a No Message PLOAM field. Thus, according to varying exemplary embodiments, the different queues in a queuing mechanism 600 could be playing different roles, i.e., from the aspect of their relative content, or effectively operate as their own queuing mechanism within the overall queuing mechanism 600, which could operate in a FIFO manner, or which could instead provide an iterative list of elements. According to exemplary embodiments an iterative queue 812, which operates as a queue which loops through its entries rather than a FIFO, is illustrated in FIG. 8(c) as part of a queuing mechanism which also includes FIFO queues 806, 808. Both FIFO and iterative queues may be provided together in queuing mechanisms 600. In such a queuing mechanism, the iterative queue could be used to provide a field for frame construction when, for example, a field is not available in a FIFO queue. As still another example, a last in first out (LIFO) queue could be used by itself, or in conjunction with a FIFO and/or iterative queue as part of the queuing mechanism 600.

From the foregoing it will be appreciated that exemplary embodiments facilitate a split between, or distribution of, the control plane which generates, for example, PLOAM messages and bandwidth map allocations, and the user planes, which generate, for example, the GTC frames which carry a GEM payload, to provide additional flexibility for GPON systems. As mentioned earlier, however, these principles can be applied to other optical communication systems, as well as non-optical communication systems. The concept of priority-based queues according to some of the foregoing exemplary embodiments that can be populated by a control plane which, for example, may not be able to sustain the extreme processing speed of the user plane, provides a flexible mechanism for specifying what the GTC header (or more generally the MAC frame header) should contain in every downstream frame. The proper sequence of events can be ensured by, for example, by placing the different queue elements in the right order in the right queue.

Another exemplary advantage associated with at least some of the aforedescribed exemplary embodiments is that the control system can specify sequences of events in bundles (configuration messages) that will be then incorporated into the protocol construction by the time critical system (MAC framer). This means that, for example, the control system, which may be incapable of fine-grain timed responses if it is operating at a lower clock speed than the MAC framer, can still successfully control parts of the protocol. For example, the control system could be designed to have only a timer resolution of 1 ms or 10 ms, while the exemplary GTC protocol requires a frame to be transmitted every 125 us.

Other variations and permutations associated with the foregoing exemplary embodiments are contemplated. Although the aforedescribed exemplary embodiments focus on the case where data fields are taken from the queues to fill one or more fields in a frame being generated, it will be appreciated that such a process need not occur for each frame being generated. For example, if a data field is not available in the queuing mechanism when a frame is being generated, the MAC framer 400, 412 can use a default value or, if the field to be filled is optional, can simply leave that field empty.

Figure 9:
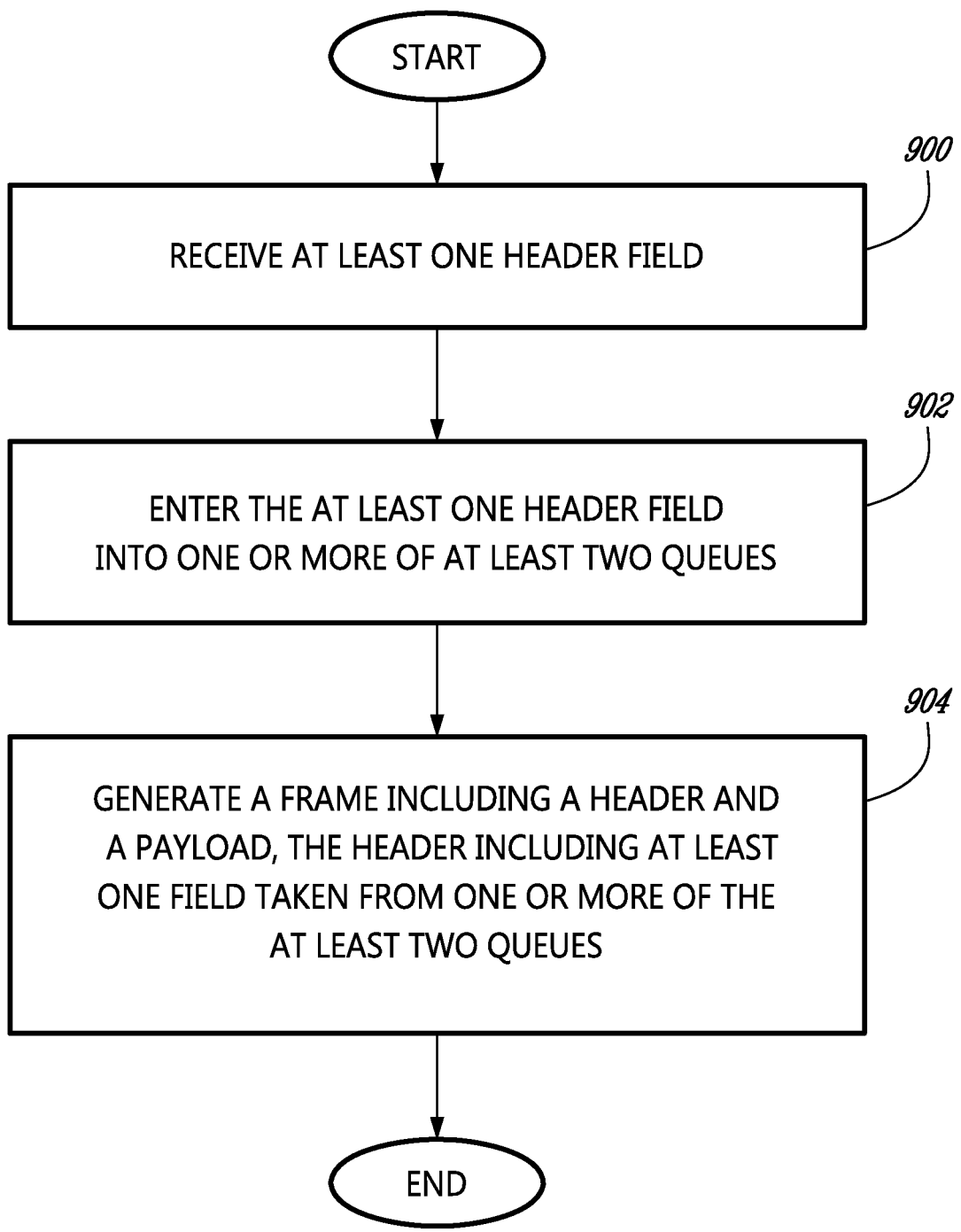
FIG. 9 is a flowchart illustrating a method for communications according to an exemplary embodiment.

Thus, according to one exemplary embodiment, a communications method includes the steps illustrated in the flowchart of FIG. 9. Therein at least header field, e.g., a PLOAM or Bw Map, is received, e.g., by a MAC framer unit at step 900. The received header field(s) is entered into one or more of at least two queues at step 902. A frame is generated, at step 904, by taking at least one field from one or more of the queues for use in the header field of the frame.

Figure 10:
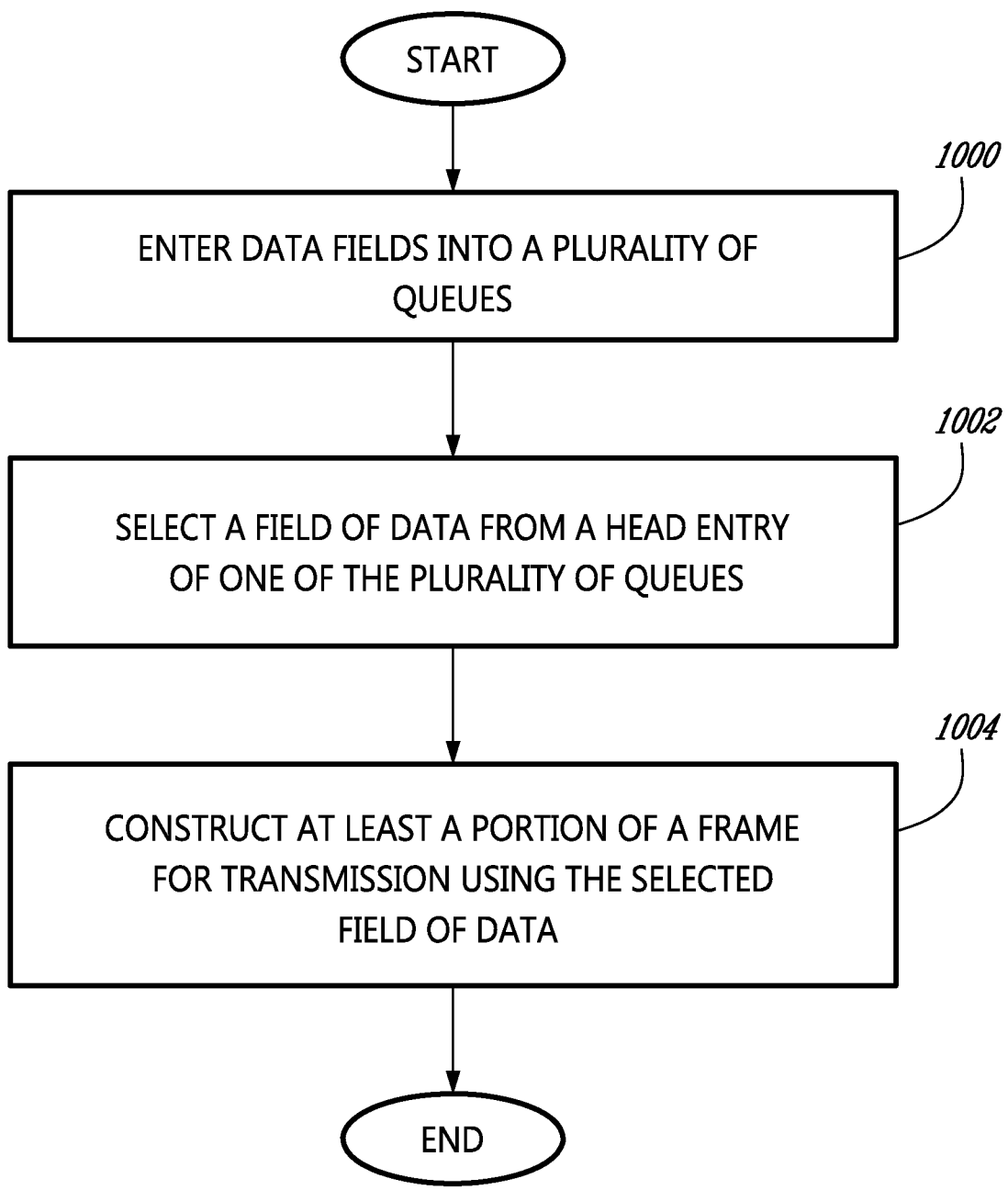
FIG. 10 is a flowchart illustrating a method for frame generation according to another exemplary embodiment.

Although the foregoing exemplary embodiments have been described in the context of MAC frames and the provision of headers thereof via queuing mechanisms, the present invention is not so limited. For example, such queuing mechanisms can be used to generate any type of frames, not just MAC frames. Additionally, in some cases, the entire frame could comprise control information which is taken from one of the queues in the queuing mechanism, i.e., the frame need not carry a separate payload portion. Moreover, these exemplary embodiments also contemplate using such queuing mechanisms to generate frames of any protocol level and without regard to whether the control plane is separated from the user plane. Thus, according to anther exemplary embodiment, a method for frame generation is illustrated in the flowchart of FIG. 10. Therein, at step 1000, data fields are entered into a plurality of queues. When a frame is to be generated, a field of data is selected, at step 1002, from a head entry of one of the plurality of queues. The selected field of data is used to construct at least a portion of a frame for transmission at step 1004.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A frame generation device for generating frames in a communication system comprising:
   a MAC control unit operating at a first clock speed for sending a configuration message having at least one header field of data for transmission in a frame to a plurality of queues;
   a MAC framer unit operating at a second clock speed higher than said first clock speed for receiving said at least one header field of data in a dedicated queue, and for generating frames for transmission, wherein said framer unit selects a header field of data from said dedicated queue and uses said selected header field of data to construct one portion of a frame for transmission with another portion containing a payload; and
   a communication interface for providing exchange of messages between said MAC control unit and MAC framer unit and permit transmission of said at least one header field of data to said MAC framer unit;
   wherein said MAC framer unit is further comprised of a plurality of queues, each queue comprising a plurality of entries for holding data fields, said framer unit storing the at least one header field of data in at least one of the plurality of entries of the plurality of queues and wherein at least one queue comprises empty data fields to cause delay in generating said frame.

2. The frame generation device of claim 1, wherein said at least one header field of data comprised in the configuration message is stored in a unique queue of the plurality of queues thereby allowing the control unit control over which queue contains which data fields.

3. The frame generation device of claim 1, wherein said at least one header field of data comprised in the configuration message is stored in more than one queue of the plurality of queues on a basis of a priority associated with each queue, on a basis of a unique data type associated with each queue or on a basis of a subset of data types associated with each queue.

4. The frame generation device of claim 3, wherein the selected header field of data is selected from a queue of said plurality of queues having a highest priority level from among said plurality of queues which comprises at least one data field.

5. The frame generation device of claim 1, wherein each of said plurality of queues is of a type selected among:
   a first in first out (FIFO) queue, wherein said selected data field is removed from said FIFO queue at a head entry and wherein an oldest entry in the FIFO queue is designated as a new head entry,
   an iterative queue, wherein said selected data field is left in the iterative queue and wherein a next entry in the iterative queue is designated as a head entry for a next selection, or
   a last in first out (LIFO) queue, wherein said selected data field is removed from said LIFO queue at a head entry and wherein a newest entry in said LIFO queue is designated as a new head entry.

6. The frame generation device of claim 1, wherein said frame is one of a Gigabit Passive Optical Network (GPON) transmission convergence (GTC) frame, a Simple Network Management Protocol (SNMP) frame and a wireless control frame.

7. The frame generation device of claim 6, wherein said frame is a GTC frame comprising a header and a payload, the header comprising a PSync field, an Ident field, an Administration and Maintenance (PLOAMd) field, a Bit Interleaved Parity (BIP) field, a PLend field and the Bandwidth (BW) map field.

8. The frame generation device of claim 7, wherein the PLOAMd field and the BW map field are extracted from at least one first in first out (FIFO) queue.

9. The frame generation device of claim 1, wherein said frame for transmission is generated using a default value or a computed value for a field when the plurality of queues do not contain an appropriate data for said field.

10. A frame generation method for generating a frame in a communication system comprising the steps of:
   receiving, from a control unit operating at a first clock speed, a configuration message comprising at least one data field;
   storing, in a framer unit operating at a second clock speed higher than said first clock speed, the at least one data field in at least one of a plurality of entries of a plurality of queues;
   selecting at least one data field from the at least one of the plurality of entries of the plurality of queues; and
   generating a frame for transmission using said at least one selected data field in one portion of said frame and another portion of said frame containing a payload;
   wherein at least one queue comprises empty data fields to cause delay in generating said frame.

11. The frame generation method of claim 10, wherein said at least one data field comprised in the configuration message is stored in more than one queue of the plurality of queues on a basis of a priority associated with each queue, on a basis of a unique data type associated with each queue or on a basis of a subset of data types associated with each queue.

12. The frame generation method of claim 11, wherein the step of selecting comprises selecting said data field from a queue of said plurality of queues having a highest priority level from among said plurality of queues which comprises at least one data field.

13. The frame generation method of claim 10, wherein said at least one data field comprised in the configuration message is stored in a unique queue of the plurality of queues thereby allowing the control unit control over which queue contains which data fields.

14. The frame generation method of claim 10, wherein each of said plurality of queues is of a type selected among:
   a first in first out (FIFO) queue, wherein said selected data field is removed from said FIFO queue at a head entry and wherein an oldest entry in the FIFO queue is designated as a new head entry,
   an iterative queue, wherein said selected data field is left in the iterative queue and wherein a next entry in the iterative queue is designated as a head entry for a next selection, or
   a last in first out (LIFO) queue, wherein said selected data field is removed from said LIFO queue at a head entry and wherein a newest entry in said LIFO queue is designated as a new head entry.

15. The frame generation method of claim 10, wherein said frame is one of a Gigabit Passive Optical Network (GPON) transmission convergence (GTC) frame, a Simple Network Management Protocol (SNMP) frame and a wireless control frame.

16. The frame generation method of claim 15, wherein said frame is a GTC frame comprising a header and a payload, the header comprising a PSync field, an Ident field, an Administration and Maintenance (PLOAMd) field, a Bit Interleaved Parity (BIP) field, a PLend field and the Bandwidth (BW) map field.

17. The frame generation method of claim 16, wherein the PLOAMd field and the BW map field are extracted from at least one first in first out (FIFO) queue.

18. The frame generation method of claim 10, wherein the step of generating said frame for transmission comprises using a default value or a computed value for a field when the plurality of queues do not contain an appropriate data for said field.

* * * * *